F. N. CONNET.
INDICATING, INTEGRATING, AND RECORDING MANOMETER.
APPLICATION FILED JULY 17, 1908.
962,317.
Patented June 21, 1910.
2 SHEETS—SHEET 1.
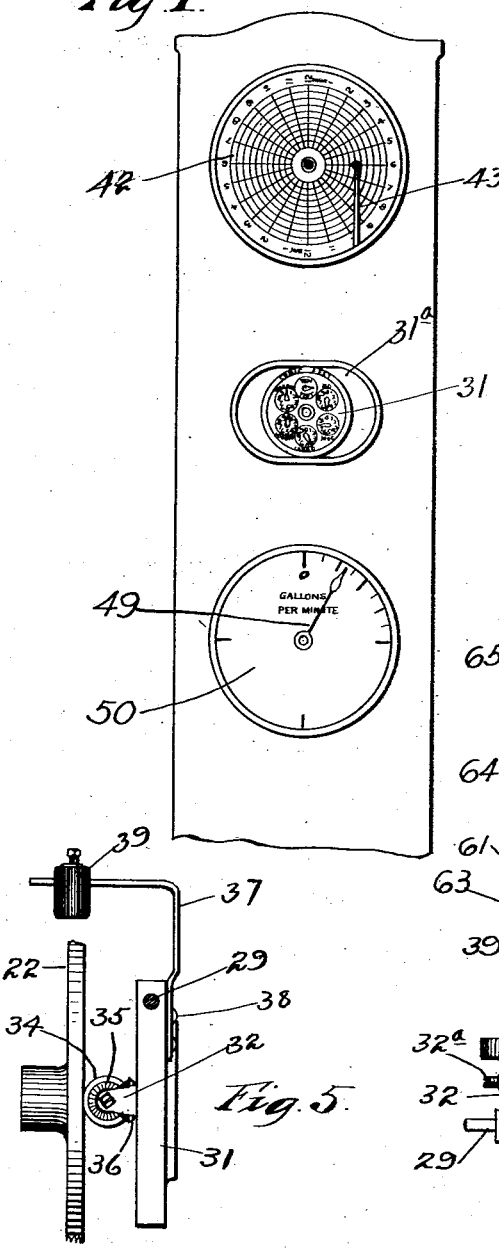
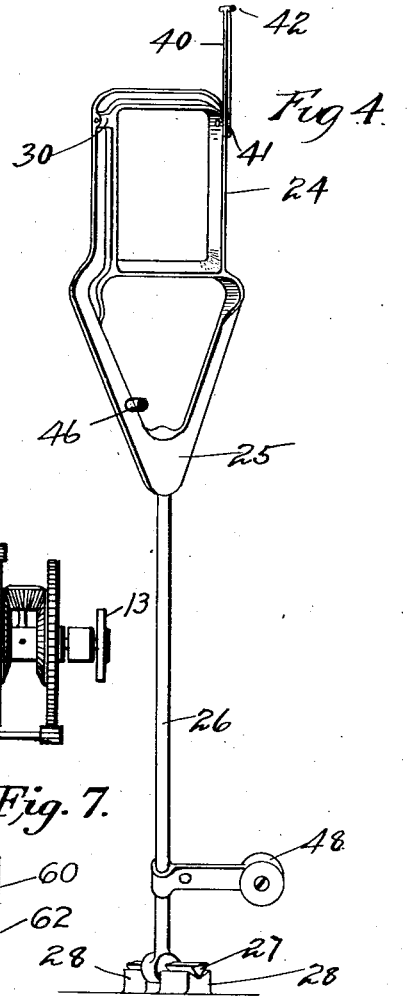
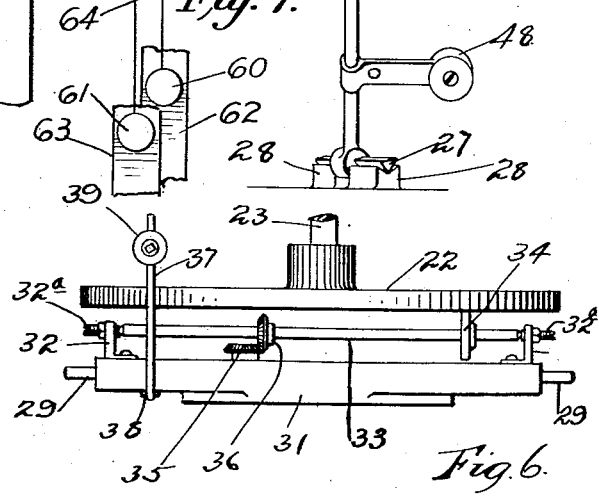
WITNESSES
C. S. Barringham
E. D. Ogden
INVENTOR
Frederick N. Connet
BY
Howard E. Barlow
ATTORNEY

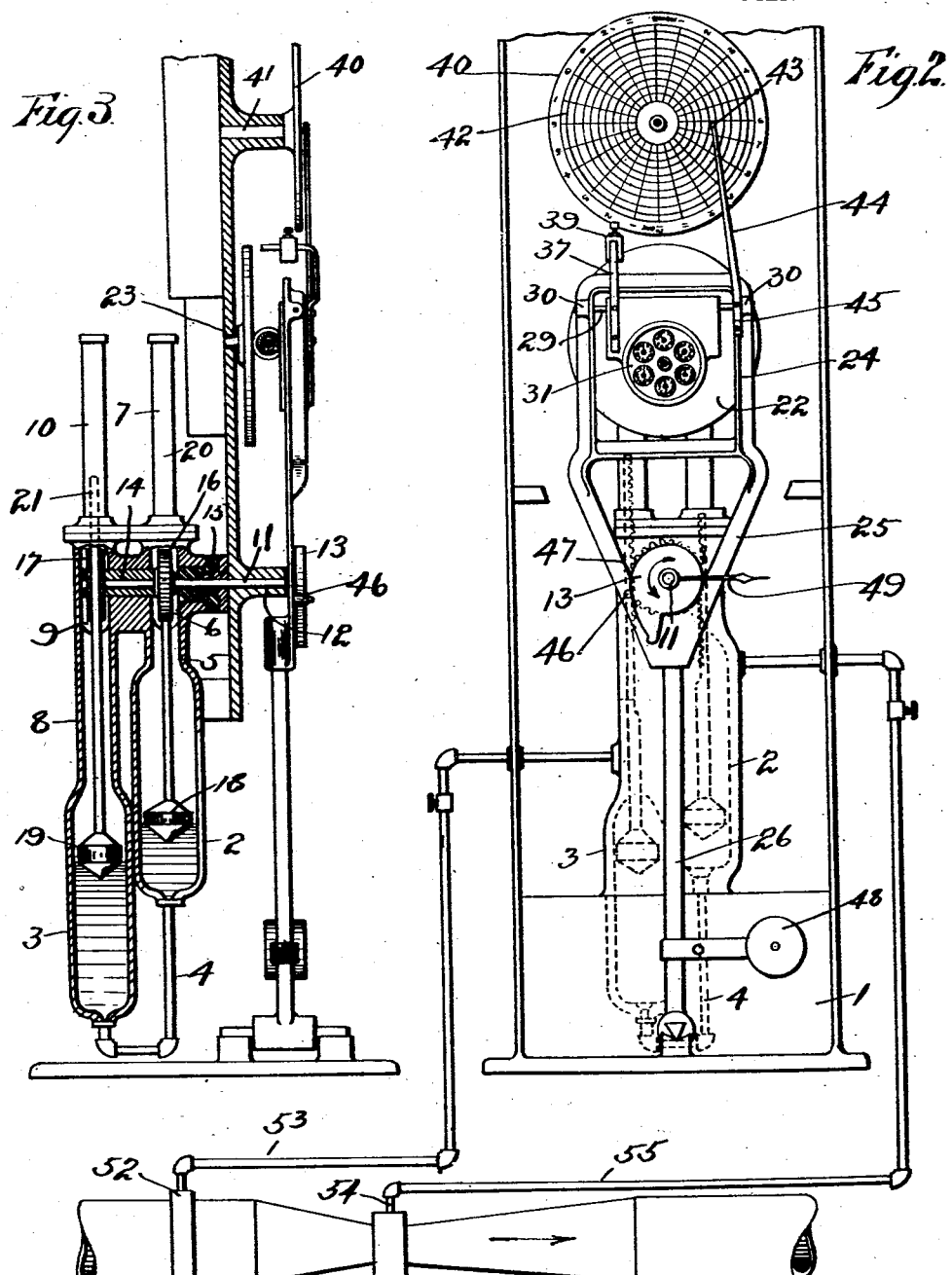

UNITED STATES PATENT OFFICE.

FREDERICK N. CONNET, OF PROVIDENCE, RHODE ISLAND.

INDICATING, INTEGRATING, AND RECORDING MANOMETER.

962,317.  Specification of Letters Patent.  Patented June 21, 1910.

Application filed July 17, 1908. Serial No. 443,968.

*To all whom it may concern:*

Be it known that I, FREDERICK N. CONNET, a citizen of the United States, residing at the city of Providence, in the county of Providence and State of Rhode Island, have invented certain new and useful Improvements in Indicating, Integrating, and Recording Manometers, of which the following is a specification, reference being had therein to the accompanying drawing.

This invention relates to a combined indicating, integrating and recording manometer, the same being adapted to automatically give the sum and total in gallons, cubic feet or other convenient units of measure, of the quantity of liquids or gases passing through a given aperture and at the same time record the variation of the flow and also to indicate at all times the quantity passing through the pipe.

The object of my present invention is to provide simple and effective means for reducing the friction of moving the integrating operating mechanism and recording pen so that a more accurate reading from both the integrator and recorder may be obtained.

In carrying out my invention I have provided an oscillatory arm or frame in which the recording pen and the integrating mechanism are operatively mounted, the weight of said frame being supported and balanced on a knife edge, whereby the friction of carrying the pen and the integrator or counter back and forth over the face of their respective disks is reduced to a minimum.

My device is particularly adapted to register the flow through a pipe or tube of the class commonly known as a "venturi tube," and said device may be actuated by any desirable mechanism, but for convenience I have shown two chambers connected to said tube one with the up-stream or high pressure side of the tube, and the second communicating with the throat or reduced portion of said tube. These chambers communicate with each other, and in each is a float supported on a column of mercury, said floats being connected through suitable mechanism to operate both the indicating and the integrating mechanism, and also to move a recording pen over the face of a continuously rotating record sheet.

The invention is fully set forth in this specification and more particularly pointed out in the appended claims.

In the drawings: Figure 1— is a front view of the manometer showing the face of the indicator, the face of the register, and the face of the recorder in the casing. Fig. 2— is a front elevation with the cover removed showing the interior mechanism by which the several devices are operated. Fig. 3— is a side elevation partly in section illustrating the operating mechanism. Fig. 4— is an enlarged view showing a detail of the oscillatory frame in which the register or counter is mounted. Fig. 5— is an enlarged side elevation illustrating the means for operating the register, also the adjustable weight for counterbalancing the same and regulating the pressure of the friction wheel on the driving disk. Fig. 6— is a top view showing the counter, the driving disk and the friction wheel mounted on a shaft and arranged to transmit its motion to said register through a pair of miter gears. Fig. 7— is a modification showing another arrangement whereby floats may actuate the cam through a set of differential gearing.

Referring to the drawings, at 1 is the base or frame on which is supported a pair of cylinders 2 and 3, cylinder 2 being set somewhat higher than cylinder 3. At the lower end of each of these cylinders is a pipe 4 through which the two cylinders are connected together. The upper end of cylinder 2 is provided with a short neck 5 communicating with the circular opening 6 and a stand-pipe 7 extends upward from said opening in line with its neck 5, making the whole cylinder self-contained and watertight. The cylinder 3 is provided with a long neck 8 communicating with a circular chamber 9, corresponding to and in line horizontally with the circular chamber 6, and a stand-pipe 10 extends upward from the opening 11 in line with its neck 8, making this cylinder also tight against a pressure of water. At 11 is a horizontal shaft extending from the circular chamber 9 through the circular chamber 6 and out through the bearing 12, the actuating cam 13 being mounted on this end. This shaft is provided with a suitable bearing 14 between the two chambers and a stuffing box 15 as it extends from the circular chamber 6 out into the front casing. A gear 16 located in this chamber is mounted on and fixed to this shaft, and a similar gear 17 located in chamber 9 is also mounted on and fixed to this same shaft. At 18 and 19 are two floats adapted to rest on and be moved vertically by the change in the levels of the mercury in both of the cylinders.

To the upper end of float 18 is connected a long rack 20 adapted to engage one side of the gear 16, while to the float 19 is also connected a similar rack 21 adapted to engage the opposite side of the gear 17. When either of the floats is way up the rack extends into its stand-pipe and when the float is way down the bottom of the same rests upon the lower end of its cylinder.

At 22 is a disk or driver mounted on the shaft 23 to be rotated continuously by clock work or other convenient mechanism, not shown.

24 designates a frame or arm, the upper portion of which is formed in substantially a rectangular shape, as at 25, and the lower portion in a triangular form, the whole being supported on the upper end of a long upright rod 26, the lower end of said rod resting on a knife edge 27 in suitable bearings 28 so as to be free to swing and at the same time reduce the friction of carrying its load. A shaft 29 extends through the upper portion of this frame and is supported in bearings 30—30 on either side thereof, and on this shaft the counter or register 31 is loosely suspended. On the back of this counter are fixed the brackets 32—32 from which the horizontal shaft 33 is rotatably supported on the adjustable bearing screws 32ª, and to this shaft is fixed the friction wheel 34. The edge of this wheel is adapted to rest against the face of the driving disk 22 and drive the counter through the gears 35 and 36.

As the shaft 29 on which the counter is hung passes through the same at a point in the rear of its center of gravity, the lower portion of said counter has a tendency to hang backward or rearward out of a vertical line and carry the friction wheel 34 against the face of the driving disk 22. In order to regulate the pressure of this friction wheel against the face of said driving disk I have provided an arm 37 fixed to the face of the register at 38 and extending upward and rearward, and on this arm is mounted a weight 39 adapted to be adjusted along the same so as to counterbalance to some extent the rearwardly hanging tendency of said register and so regulate the pressure of the friction wheel against the face of the driving disk. The front face of the machine is cut away or slotted at 31ª to allow the counter to be visible as it is moved from one end of its stroke to the other. Above this counter is a record sheet disk 40 the same being mounted on a shaft 41 to be continuously rotated by clock works or other convenient mechanism, not shown. On this disk is mounted a record sheet 42, which may be ruled or arranged in any convenient manner. A recording pen or pencil 43 is supported on an upwardly extending arm 44, which latter is connected at 45 to one side of the frame 24, said pen being thus adapted to be moved over and to mark upon the face of the record sheet as said frame is oscillated or moved in the manner hereinafter described. In order to control the movement of this oscillatory frame a contact roll 46 is arranged to project from the face of said frame and is caused to rest against the edge 47 of the actuating cam 13 by means of the counterbalancing weight 48. The working edge of this cam is made in a shape necessary to control the movement of said frame in a given proportion to the amount of water passing through the tube, so that it will be properly positioned to cause a proper record to be made on the chart and also to properly actuate the register. In some cases it is also advisable to provide an indicator which will show at a glance the number of gallons passing through the meter at the time of observation. In order to accomplish this result a hand 49 is mounted on the end of the shaft 11, which is caused to move over the face of a graduated disk 50, see Fig. 1, so that the position of the hand on the same will accurately indicate the number of gallons passing through at the time of the reading.

The operation of the device may be more fully described as follows: The liquids or gases flow through the tube 51 in the direction of the arrow. The up-stream side of the tube is connected at 52 by means of pipe 53 to the cylinder 3, while the throat is connected at 54 by the pipe 55 to the cylinder 2. When there is no flow through the tube the pressure at all points of the tube is, of course, equal and the floats in both cylinders are at the same height. As soon as the flow begins the pressure in the throat is decreased and becomes less than that at the point 52, therefore the mercury in chamber 3 is forced downward by the excess of pressure on this side, raising the mercury and float in the opposite chamber a corresponding amount. As these floats move one up and one down they act with corresponding force through their respective racks and gears on opposite sides of the shaft 11 to rotate the actuating cam 13 in proportion to their movement. When there is no flow through the tube the indicating hand 49 is at zero, the counter operating friction wheel 34 is at the center of the rotating driving disk 22 where it will not turn, and the marking pen 43 is at the zero point on its record sheet. As soon as the flow begins the floats change their relative levels rotating the cam in the direction of the arrow thereby allowing the frame to be moved to the right by means of the counterbalance weight 48, carrying the contact wheel from the center of the disk along the face of the same where it receives a rotary motion at a speed in proportion to its distance from the center of the plate.

The greater the velocity of the water through the tube the greater the movement of the frame, and the faster the counter is driven, the indicating hand is also moved and the finger is carried a corresponding distance from the center of its disk.

The integrating mechanism shows at a glance the total amount that has passed through the tube and the quantity, whether constant or varying, is clearly and accurately recorded on the record sheet for a predetermined period. These sheets when operated upon by the mechanism described should be removed and replaced by a fresh one every twenty-four hours. The integrating mechanism keeps on adding from day to day, and shows at all times the total amount used, while the indicating hand shows at once the amount that is passing through at the time of observation.

By the use of my improved construction the friction of moving the integrating mechanism is reduced to the minimum, thus rendering it possible for the device, owing to the lack of friction, to accurately indicate, register and record the amount of flow.

Fig. 7 illustrates a modification by which the cam 13 may be actuated, whereby the floats 60 and 61 are moved in their respective cylinders 62 and 63 by the difference in the pressures in the main pipe, said floats being arranged to operate said cam through the cords 64 and 65 and the differential gearing shown.

I do not restrict myself to the constructions shown of using floats in cylinders for the purpose of operating the mechanism, as any suitable or convenient means may be employed for controlling the movement of the counter, the recording pen and the indicating hand in proportion to the velocity of flow through the pipe, without departing from the spirit and scope of my invention.

Having thus described my invention, what I claim as new and desire to secure by Letters Patent, is:

1. In a liquid meter, a main pipe, a recording disk, a recording pen, an adjustable member mounted on a knife edge for carrying only its own weight and that of said pen, and means operated by the difference of pressure in said pipe for moving said member to cause said pen to record the flow through said pipe.

2. In a liquid meter, a main pipe, a recording disk, a recording pen, an adjustable member mounted on a knife edge for carrying only its own weight and that of said pen, and a cam operated by the difference of pressure in said pipe for controlling the movement of said member to cause said pen to record the flow through said pipe.

3. In a liquid meter, a main pipe, a recording disk, a recording pen, a counter, an adjustable member mounted on a knife edge for carrying only its own weight, that of said counter and said recording pen, and means operated by the difference of pressures in said pipe for operating said member to record the flow through said pipe.

4. In a liquid meter, a main pipe, a recording disk, a recording pen, a counter, an adjustable member mounted on a knife edge for carrying only its own weight, that of said counter and said recording pen, and a cam for controlling the movement of said member and its instrumentalities to record the flow through said pipe.

5. In a liquid meter, a main pipe, a recording disk, a recording pen, an adjustable arm mounted on a knife edge for carrying the weight of said arm and that of said pen, a cam for controlling the movement of said arm, and a hand operated in time with said cam for indicating the flow through said pipe.

6. In a liquid meter, a main pipe, a recording disk, a recording pen, a counter, an oscillatory frame for carrying said counter and recording pen, a cam for operating said frame, and a hand operated in time with said cam for indicating the flow through said main pipe.

7. In a liquid meter, a main pipe, a recording disk, a recording pen, a counter, an oscillatory frame for carrying said counter and recording pen, a cam adapted to operate said frame, means for operating said cam in proportion to the velocity of flow through said pipe, and a hand operated in time with said cam for indicating the flow through said main pipe.

8. In a liquid meter, a main pipe, a recording disk, a recording pen, a counter, oscillatory means supported on a knife edge for carrying said counter and recording pen, a rotatable cam mounted on a shaft, means for operating said shaft and cam to control the movement of said oscillatory means in proportion to the velocity of flow through said pipe, and a hand mounted on said cam shaft adapted to indicate the flow through said main pipe.

In testimony whereof I affix my signature in presence of two witnesses.

FREDERICK N. CONNET.

Witnesses:
  WM. R. TILLINGHAST,
  HOWARD E. BARLOW.